(12) United States Patent
Zhong et al.

(10) Patent No.: US 12,248,456 B2
(45) Date of Patent: Mar. 11, 2025

(54) UTILIZING A STRUCTURED AUDIT LOG FOR IMPROVING ACCURACY AND EFFICIENCY OF DATABASE AUDITING

(71) Applicant: International Business Machines Corporation, Armonk, NY (US)

(72) Inventors: Jia Tian Zhong, Beijing (CN); Peng Hui Jiang, Beijing (CN); Dong Hui Liu, Beijing (CN); Xing Xing Shen, Beijing (CN); Jia Yu, Beijing (CN); Yong Yin, Beijing (CN); Jing Lu, Beijing (CN); Xiao Yan Tang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 126 days.

(21) Appl. No.: 17/708,440

(22) Filed: Mar. 30, 2022

(65) Prior Publication Data
US 2023/0315715 A1    Oct. 5, 2023

(51) Int. Cl.
*G06F 16/23* (2019.01)
(52) U.S. Cl.
CPC ................................ *G06F 16/2365* (2019.01)
(58) Field of Classification Search
CPC .. G06F 16/2365; G06F 16/2358; G06F 16/21; G06F 11/302; G06F 11/3438
See application file for complete search history.

(56) References Cited

U.S. PATENT DOCUMENTS

| 8,799,225 B2 | 8/2014 | Vaitzblit et al. |
| 9,189,356 B2 | 11/2015 | Iyer et al. |
| 11,068,373 B1 | 7/2021 | Meurer et al. |

(Continued)

FOREIGN PATENT DOCUMENTS

| CN | 107154982 B | 9/2017 |
| CN | 114218273 A * | 3/2022 |

OTHER PUBLICATIONS

Sinha, Building a SQL Database Audit System using Kafka, MongoDB, Maxwell's Daemon, pp. 1-13 (Year: 2021).*

(Continued)

*Primary Examiner* — Albert M Phillips, III
(74) *Attorney, Agent, or Firm* — Shackelford, McKinley & Norton, LLP; Robert A. Voigt, Jr.

(57) ABSTRACT

A computer-implemented method, system and computer program product for improving accuracy and efficiency of auditing databases. A table, list or index of a database is analyzed to identify metadata, which includes time series data, user data, an Internet Protocol address and operation data. The identified metadata is associated with the corresponding record or row of the table, list or index from which the metadata was extracted. A determination is then made as to whether to record a raw data image associated with the record or row of the analyzed table, list or index based on the corresponding data operation. The identified metadata as well as the recorded data images, if any, are stored in a structured audit log. Auditing information is then obtained from a structured audit log based on matching the record or row identifier (RID) associated with the query with the RID associated with the structured audit log.

17 Claims, 10 Drawing Sheets

(56) References Cited

U.S. PATENT DOCUMENTS

| | | | |
|---|---|---|---|
| 11,768,954 B2* | 9/2023 | Jagtap | G06F 16/211 |
| | | | 726/27 |
| 2019/0171633 A1 | 6/2019 | Demla et al. | |
| 2022/0245120 A1* | 8/2022 | Hanson | G06F 16/245 |

OTHER PUBLICATIONS

Gaetjen, Oracle Database 12c Security, Chap. 12, pp. 1-19 (Year: 2015).*

Gunnar Morling, "Building Audit Logs with Change Data Capture and Stream Processing," https://debezium.io/blog/2019/10/01/audit-logs-with-change-data-capture-and-stream-processing, Oct. 1, 2019, pp. 1-18.

Microsoft, "Auditing for Azure SQL Database and Azure Synapse Analytics," https://docs.microsoft.com/en-us/azure/azure-sql/database/auditing-overview, Oct. 9, 2021, pp. 1-20.

* cited by examiner

UTILIZING A STRUCTURED AUDIT LOG FOR IMPROVING ACCURACY AND EFFICIENCY OF DATABASE AUDITING

TECHNICAL FIELD

The present disclosure relates generally to database auditing, and more particularly to utilizing a structured audit log for improving accuracy and efficiency of database auditing.

BACKGROUND

Database auditing is the monitoring and recording of selected user database actions. It can be based on individual actions, such as the type of SQL statement executed, or a combination of factors, such as the user name, application, time, etc.

Such auditing is typically used to enable future accountability for current actions taken in a particular schema, table, or row, or affecting specific content. Furthermore, such auditing may be used to deter users (or others) from inappropriate actions based on that accountability. Also, such auditing enables one to investigate suspicious activity. For example, if a user is deleting data from tables, then the security administrator might decide to audit all connections to the database and all successful and unsuccessful deletions of rows from all tables in the database. Additionally, such auditing may be used to monitor and gather data about specific database activities. For example, statistics about which tables are being updated, how many logical input/output operations are performed, or how many concurrent users connect at peak times can be gathered. Furthermore, such auditing may be used to detect problems with an authorization or access control implementation.

Based on such uses of database auditing, it is important to identify which rows and columns of a database were accessed as well as by whom and when. Unfortunately, such information is not easily tracked and recorded, especially for NoSQL ("non-structured query language (SQL)") databases.

A NoSQL database provides a mechanism for storage and retrieval of data that is modeled in means other than the tabular relations used in relational databases. The data structures used by NoSQL databases (e.g., key-value pair) are different from those used by default in relational databases making some operations faster in NoSQL. Furthermore, NoSQL databases utilize an unstructured storage which allows for high-performance, agile processing of information at a massive scale. For example, a NoSQL database may store unstructured data across multiple processing nodes as well as across multiple servers. However, by storing unstructured data across multiple processing nodes as well as across multiple servers, it causes auditing of such databases to be a challenge.

Currently, an audit plugin may be utilized to attempt to monitor and record database actions, such as for a NoSQL database. Unfortunately, only data operations (e.g., update operation, read operation) are recorded. As a result of the limited data that is monitored and recorded, the auditing is deficient in terms of identifying which rows and columns of a database were accessed as well as by whom and when.

Alternatively, a temporal table, may be utilized to attempt to monitor and record database actions, such as for a NoSQL database. Unfortunately, some operations are not recorded. As in the scenario of using the audit plugin, the use of the temporal table results in limited data being monitored and recorded thereby resulting in the auditing being deficient in terms of identifying which rows and columns of a database were accessed as well as by whom and when. Furthermore, the use of a temporal table is time consuming and inefficient, especially involving frequent reading, adding, deleting and updating operations on the database. Additionally, requests to obtain certain information, such as dirty read data in transaction concurrency (running together of two transactions, such as accessing the same database rows during overlapping time periods), may not be achievable using a temporal table.

Consequently, there is not currently a means for effectively auditing database actions in an efficient manner that enables accurate attestation of data accesses of the database (e.g., NoSQL database).

SUMMARY

In one embodiment of the present disclosure, a computer-implemented method for improving accuracy and efficiency of database auditing comprises analyzing a table, list or index of a database to identify metadata, where the metadata comprises time series data, user data, an Internet Protocol (IP) address and operation data. The method further comprises associating the identified metadata with a corresponding record or row of the analyzed table, list or index of the database. The method additionally comprises determining whether to record a data image associated with the record or row of the analyzed table, list or index of the database based on a corresponding data operation. Furthermore, the method comprises storing the identified metadata and a recorded data image, if any, in a structured audit log associated with a record or row identifier of the record or row of the analyzed table, list or index of the database.

In this manner, the accuracy and efficiency of database auditing is improved by utilizing structured audit logs.

In another embodiment of the present disclosure, a computer program product for improving accuracy and efficiency of database auditing, where the computer program product comprises one or more computer readable storage mediums having program code embodied therewith, where the program code comprises programming instructions for analyzing a table, list or index of a database to identify metadata, where the metadata comprises time series data, user data, an Internet Protocol (IP) address and operation data. The program code further comprises the programming instructions for associating the identified metadata with a corresponding record or row of the analyzed table, list or index of the database. The program code additionally comprises the programming instructions for determining whether to record a data image associated with the record or row of the analyzed table, list or index of the database based on a corresponding data operation. Furthermore, the program code comprises the programming instructions for storing the identified metadata and a recorded data image, if any, in a structured audit log associated with a record or row identifier of the record or row of the analyzed table, list or index of the database.

In this manner, the accuracy and efficiency of database auditing is improved by utilizing structured audit logs.

In a further embodiment of the present disclosure, a system comprises a memory for storing a computer program for improving accuracy and efficiency of database auditing and a processor connected to the memory. The processor is configured to execute program instructions of the computer program comprising analyzing a table, list or index of a database to identify metadata, where the metadata comprises time series data, user data, an Internet Protocol (IP) address and operation data. The processor is further configured to execute the program instructions of the computer program comprising associating the identified metadata with a corresponding record or row of the analyzed table, list or index of the database. The processor is additionally configured to execute the program instructions of the computer program comprising determining whether to record a data image associated with the record or row of the analyzed table, list or index of the database based on a corresponding data operation. Furthermore, the processor is configured to execute the program instructions of the computer program comprising storing the identified metadata and a recorded data image, if any, in a structured audit log associated with a record or row identifier of the record or row of the analyzed table, list or index of the database.

In this manner, the accuracy and efficiency of database auditing is improved by utilizing structured audit logs.

The foregoing has outlined rather generally the features and technical advantages of one or more embodiments of the present disclosure in order that the detailed description of the present disclosure that follows may be better understood. Additional features and advantages of the present disclosure will be described hereinafter which may form the subject of the claims of the present disclosure.

BRIEF DESCRIPTION OF THE DRAWINGS

A better understanding of the present disclosure can be obtained when the following detailed description is considered in conjunction with the following drawings, in which.

DETAILED DESCRIPTION

Figure 1:
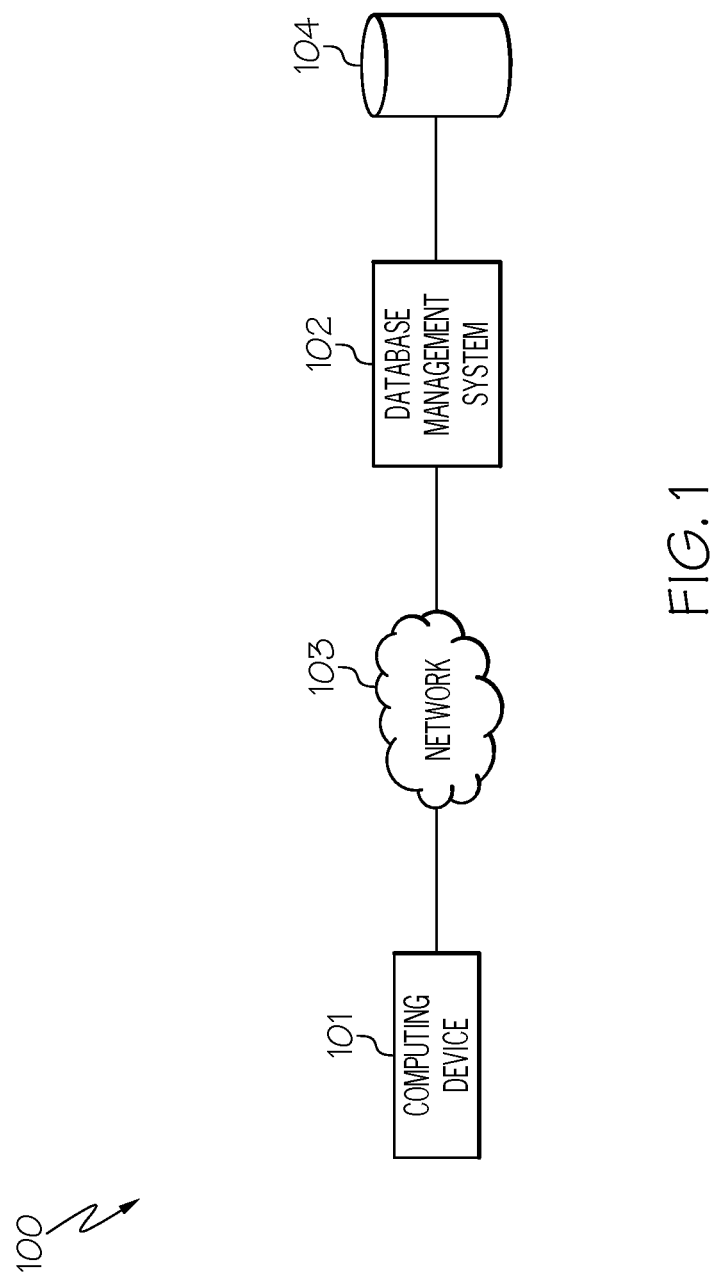
FIG. 1 illustrates a communication system for practicing the principles of the present disclosure in accordance with an embodiment of the present disclosure.

As stated in the Background section, there is not currently a means for effectively auditing database actions in an efficient manner that enables accurate attestation of data accesses of the database (e.g., NoSQL database).

The embodiments of the present disclosure provide a means for building and using a structured audit log for accurate attestation of data accesses of the database (e.g., NoSQL database). A more detailed description of these and other features will be provided below.

In some embodiments of the present disclosure, the present disclosure comprises a computer-implemented method, system and computer program product for improving accuracy and efficiency of auditing databases. In one embodiment of the present disclosure, a table, list or index of a database is analyzed to identify metadata, which includes time series data, user data, an Internet Protocol address and operation data. "Metadata," as used herein, refers to data that provides information about other data. "Time series data," as used herein, refers to the particular order in which a query was issued to update, insert, delete, etc. information from a table, list or index of the database. "User data," as used herein, refers to an identifier of a particular user that issued the query to access the record or row of the table, list or index of the database. "Internet Protocol (IP) address," as used herein, refers to the unique identifier assigned to a device, such as the database. "Operation data," as used herein, refers to the operation that is being requested to be performed on the database by the query issued by the user of a computing device. In one embodiment, such operations include the update operation, the delete operation, the read operation, a data definition language operation (used to define data structures, such as create table, alter table, drop table, create view, etc. in a structured query language), a batch data manipulation language operation (used to manipulate multiple records or rows of a table, list or index of the database), etc. The identified metadata is associated with the corresponding record or row of the table, list or index of the database from which the metadata was extracted. A determination is then made as to whether to record a raw data image associated with the record or row of the analyzed table, list or index of the database based on the corresponding data operation. A "raw data image" or "data image," as used herein, refers to an image of the data resulting from the data operation (e.g., update operation). For example, a data image of the data resulting from the data operation may be recorded in response to an update or insert operation. However, the data image of the data resulting from the data operation may not be recorded in response to a delete operation or in response to a read/query operation except when a concurrent transaction exists. The identified metadata as well as the recorded data images, if any, are then stored in a "structured audit log" associated with the record or row identifier of the record or row of the analyzed table, list or index of the database upon which such structured information was obtained. A "structured audit log," as used herein, refers to a data structure that stores said auditing information (e.g., metadata, recorded data images, etc.). In one embodiment, the structured audit log is stored in the storage device (e.g., memory, disk unit) of a database management system in which future queries to audit the database may access such stored structured audit logs to obtain auditing information about the database. In one embodiment, the appropriate auditing information is obtained from the stored structured audit logs based on matching the row or record identifier associated with the query with the record or row identifier associated with a structured audit log containing the requested database auditing information. In this manner, the accuracy and efficiency of database auditing is improved by utilizing structured audit logs.

In the following description, numerous specific details are set forth to provide a thorough understanding of the present disclosure. However, it will be apparent to those skilled in the art that the present disclosure may be practiced without such specific details. In other instances, well-known circuits have been shown in block diagram form in order not to obscure the present disclosure in unnecessary detail. For the most part, details considering timing considerations and the like have been omitted inasmuch as such details are not necessary to obtain a complete understanding of the present disclosure and are within the skills of persons of ordinary skill in the relevant art.

Referring now to the Figures in detail, FIG. 1 illustrates an embodiment of the present disclosure of a communication system 100 for practicing the principles of the present disclosure. Communication system 100 includes a computing device 101 connected to a database management system 102 via a network 103. Furthermore, as illustrated in FIG. 1, database management system 102 is connected to a database 104 (e.g., NoSQL database).

Computing device 101 may be any type of computing device (e.g., portable computing unit, Personal Digital Assistant (PDA), laptop computer, mobile device, tablet personal computer, smartphone, mobile phone, navigation device, gaming unit, desktop computer system, workstation, Internet appliance and the like) configured with the capability of connecting to network 103 and consequently communicating with other computing devices 101 and database management system 102. It is noted that both computing device 101 and the user of computing device 101 may be identified with element number 101.

Network 103 may be, for example, a local area network, a wide area network, a wireless wide area network, a circuit-switched telephone network, a Global System for Mobile Communications (GSM) network, a Wireless Application Protocol (WAP) network, a WiFi network, an IEEE 802.11 standards network, various combinations thereof, etc. Other networks, whose descriptions are omitted here for brevity, may also be used in conjunction with system 100 of FIG. 1 without departing from the scope of the present disclosure.

In one embodiment, the user of computing device 101 issues a query (e.g., structured query language (SQL) query, query JSON (JavaScript® Object Notation) objects) to database management system 102 to update, insert, delete, etc. information from database 104. For example, the user may issue the query of INSERT INTO to add a new row of data to a table in database 104. Such a query will be processed by database management system 102, such as storing and retrieving data as requested by the user.

In one embodiment, database management system 102 is configured to maintain database 104, such as a relational database or a NoSQL database. In one embodiment, database management system 102 corresponds to a SQL server configured to use the structured query language (SQL) for querying and maintaining database 104. In one embodiment, database management system 102 corresponds to a server configured to query JSON (JavaScript® Object Notation) data (e.g., JSON objects) stored in NoSQL database 104.

In one embodiment, database management system 102 is configured to build and use a structured audit log for accurate attestation of data accesses of database 104 as discussed further below. In one embodiment, such a structured audit log includes metadata (e.g., time series data, user data, an Internet Protocol (IP) address and operation data) along with a raw data image, if applicable.

"Time series data," as used herein, refers to the particular order in which a query was issued to update, insert, delete, etc. information from a table, list or index of database 104. For example, a first query to access a row may have the time series data of TS1 (time series #1) and a subsequent query to access the same row may have the time series data of TS2 thereby indicating that the query followed the query associated with TS1.

"User data," as used herein, refers to an identifier of a particular user that issued the query to access the record or row of the table, list or index of database 104.

"Internet Protocol (IP) address," as used herein, refers to the unique identifier assigned to a device, such as database 104. In one embodiment, the IP address included in the metadata corresponds to the IP address of database 104 that is being queried by the user of computing device 101.

"Operation data," as used herein, refers to the operation that is being requested to be performed on database 104 by the query issued by the user of computing device 101. In one embodiment, such operations include the update operation, the delete operation, the read operation, a data definition language operation (used to define data structures, such as create table, alter table, drop table, create view, etc. in structured query language), a batch data manipulation language operation (used to manipulate multiple records or rows of a table, list or index of database 104), etc.

A "raw data image," as used herein, refers to an image of the data resulting from the data operation (e.g., update operation). In one embodiment, such an image may only include the data of the changed columns or rows.

In one embodiment, such information (e.g., metadata, raw data image) is associated with a record or row identifier of a table, list or index of database 104, where such an identifier identifies the record or row upon which the data operation was performed.

In one embodiment, such information (e.g., metadata, raw data image) along with the record or row identifier of the table, list or index of database 104 is stored in a "structured audit log" by database management system 102. A "structured audit log," as used herein, refers to a data structure that stores said information.

In one embodiment, the structured audit log further includes pointers to previously linked queries that were executed prior to the query associated with the metadata and raw data image, if applicable, in question.

In one embodiment, the structured audit log is stored in the storage device (e.g., memory, disk unit) of database management system 102.

Upon building the structured audit log, database management system 102 uses the structured audit log for accurate attestation of data accesses of database 104.

A more detailed description of these and other features will be provided further below. Furthermore, a description of the software components of database management system 102 is provided below in connection with FIG. 2 and a description of the hardware configuration of database management system 102 is provided further below in connection with FIG. 3.

System 100 is not to be limited in scope to any one particular network architecture. System 100 may include any number of computing devices 101, database management systems 102, networks 103 and databases 104.

A discussion regarding the software components used by database management system 102 to improve accuracy and efficiency of database auditing by utilizing a structured audit log is provided below in connection with FIG. 2.

Figure 2:
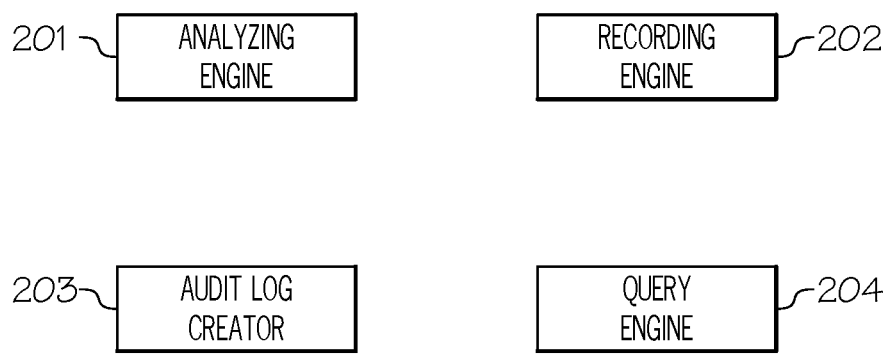
FIG. 2 is a diagram of the software components of the database management system to improve accuracy and efficiency of database auditing by utilizing a structured audit log in accordance with an embodiment of the present disclosure.

FIG. 2 is a diagram of the software components of database management system 102 to improve accuracy and efficiency of database auditing by utilizing a structured audit log in accordance with an embodiment of the present disclosure.

Referring to FIG. 2, in conjunction with FIG. 1, database management system 102 includes an analyzing engine 201 configured to analyze tables, lists and/or indexes of database 104 to identify metadata, which includes time series data, user data, an Internet Protocol (IP) address and operation data.

A "table," as used herein, refers to a collection of related data held in a table format within database 104.

A "list," as used herein, refers to a set of entries or values, such as entries or values stored in a field(s) of database 104.

An "index," as used herein, refers to a data structure that improves the speed of data retrieval operations on a database table of database 104. Indexes are used to quickly locate data without having to search every row in a database table every time a database table is accessed. In one embodiment, the index is created using one or more columns of a database table, providing the basis for both rapid random lookups and efficient access of ordered records. In one embodiment, the index is a copy of selected columns of data, from a table, that is designed to enable an efficient search. In one embodiment, the index includes a "key" or direct link to the original row of data from which it was copied to allow the complete row to be retrieved efficiently.

"Metadata," as used herein, refers to data that provides information about other data. In one embodiment, metadata includes time series data, user data, an Internet Protocol (IP) address and operation data.

As stated above, "time series data," as used herein, refers to the particular order in which a query was issued to update, insert, delete, etc. information from a table, list or index of database 104. For example, a first query to access a row may have the time series data of TS1 (time series #1) and a subsequent query to access the same row may have the time series data of TS2 thereby indicating that the query followed the query associated with TS1.

"User data," as used herein, refers to an identifier of a particular user that issued the query to access the record or row of the table, list or index of database 104.

"Internet Protocol (IP) address," as used herein, refers to the unique identifier assigned to a device, such as database 104. In one embodiment, the IP address included in the metadata corresponds to the IP address of database 104 that is being queried by the user of computing device 101.

"Operation data," as used herein, refers to the operation that is being requested to be performed on database 104 by the query issued by the user of computing device 101. In one embodiment, such operations include the update operation, the delete operation, the read operation, a data definition language operation (used to define data structures, such as create table, alter table, drop table, create view, etc. in structured query language), a batch data manipulation language operation (used to manipulate multiple records or rows of a table, list or index of database 104), etc.

In one embodiment, analyzing engine 201 identifies the metadata from the tables, lists or indexes of database 104 via a method call, such as the getMetaData( ) method using a connection object.

In one embodiment, analyzing engine 201 utilizes a database documentation tool to extract the metadata from the tables, lists or indexes of database 104. Examples of database documentation tools to extract the metadata from the tables, lists or indexes of database 104, include, but not limited to, dbdocs.io, Dataedo, Apex® SQL RedGate® SQL, SchemaSpy, dbForge Documente, DBScribe, Sentry-One® DOC xPress, Innovasys Document X, etc.

Analyzing engine 201 is further configured to associate the identified metadata to the corresponding record or row of the table, list and/or index from which the metadata was extracted. In one embodiment, such an association is through the record or row identifier ("RID"), which identifies a particular record or row of the table, list or index. In one embodiment, the record or row identifier ("RID") corresponds to the address of the row in the table, list or index.

For example, if the metadata was extracted from the record or row of a table of database 104 corresponding to the record or row identifier ("RID") of 234567, then the metadata extracted from such a record or row is associated with RID 234567.

In one embodiment, analyzing engine 201 identifies the RID via the ROWID statement, such as in SQL.

In one embodiment, analyzing engine 201 is further configured to link the queries of the records or rows of the analyzed tables, lists or indexes of database 104 to previously executed queries, if any, based on the time series data. For example, a query issued by the user of computing device 101 to request to access data from a particular record or row of the table, list or index of database 104, such as to manipulate or retrieve it, may occur at time T3. A prior query accessing the same record or row of the table, list or index of database 104 may occur at time T2, which may have occurred after the query accessed the same record or row of the table, list or index of database 104 at time T1. The query that occurred at time T3 may then be linked to the queries that occurred at times T2 and T1.

In one embodiment, such linking may be accomplished via pointers provided by analyzing engine 201, such as a pointer in the structured audit log associated with the query at time T3 that points to the structured audit log associated with the query at time T2 that contains a pointer that points to the structured audit log associated with the query at time T1. In this manner, the result sets (structured audit logs with metadata and data images, if applicable) of historical queries can be retrieved easily.

In one embodiment, analyzing engine 201 determines such linking based on the record or row identifier ("RID") associated with the queries. For example, the query that occurred at times T1, T2 and T3 may all be associated with the same RID, such as 12345. In one embodiment, analyzing engine 201 stores the RIDs for the analyzed tables, lists or indexes of database 104, such as in a data structure (e.g., table). In one embodiment, analyzing engine 201 further stores the time series data associated with the RIDs in the data structure. Such time series data can be used to link the structured audit logs (contain time series data as discussed further below) associated with the queries that occurred in the past that are associated with the same RID. In one embodiment, such a data structure is stored in the storage device (e.g., memory, disk unit) of database management system 102.

Database management system 201 further includes a recording engine 202 configured to record a raw data image of the data resulting from a data operation (e.g., update operation), such as the data resulting from an update operation being performed on a particular row of a table of database 104. A "raw data image," as used herein, refers to an image of the data resulting from the data operation (e.g., update operation).

In one embodiment, recording engine 202 determines whether to record a data image of the data resulting from a data operation based on the type of data operation.

In one embodiment, recording engine 202 determines the type of operation (e.g., update, delete, insert, read, data definition language, batch data manipulation language, etc.) from the extracted metadata. For example, analyzing engine 201 may have extracted metadata from a row of a table (identified with RID 12345) having the time series (TS) data of TS3, the user data of "User 1," the IP address of database 104 of "IP1" and the data operation of "UPD" representing the update operation.

As discussed above, in one embodiment, recording engine 202 determines whether to record a raw data image associated with the record or row of the analyzed table, list or index of database 104 based on the corresponding data operation. In one embodiment, recording engine 202 records a data image of the data resulting from the update ("UPD") or insert ("INS") operation after execution of said operation. In one embodiment, recording engine 202 does not record a data image of the data resulting from a read/query operation ("QRY") except when a concurrent transaction exists. In this manner, dirty read data involving a transaction concurrency may be obtained as discussed further below. A "dirty read," as used herein, occurs when a transaction reads data that has not yet been committed. For example, suppose that transaction 1 updates a row of database 104. Transaction 2 reads the updated row before transaction 1 commits the update. Such a situation is said to correspond to a "dirty read."

In one embodiment, recording engine 202 does not record the data image of the data resulting from a delete operation ("DLT").

In one embodiment, recording engine 202 records the SQL data definition language (DDL) statement as the data image resulting from a DDL operation. In one embodiment, a "DDL" operation is used to define data structures, such as create table, alter table, drop table, create view, etc. in structured query language (SQL).

In one embodiment, recording engine 202 records the SQL expression as the data image resulting from a batch data manipulation langue (DML) operation. In one embodiment, a DML operation is used to manipulate data itself. Examples of a DML operation include the insert, update or delete instruction in SQL.

Examples of software tools utilized by recording engine 202 to record data images, if applicable, include, but not limited to, Equalum®, Hevo Data, HVR, IBM® Web Sphere®, Qlik®, Oracle® GoldenGate®, Precisely®, Striim®. Talend®, etc.

Database management system 102 further includes an audit log creator 203 configured to create a structured audit log based on the information obtained from analyzing engine 201 and recording engine 202. A "structured audit log," as used herein, refers to a data structure that stores the metadata extracted and identified by analyzing engine 201, raw data images, if any, that were recorded by recording engine 202, as well as any pointers provided by analyzing engine 201 that point to a structured audit log(s) associated with historical queries. In one embodiment, such structured audit logs are stored in a storage device (e.g., memory, disk unit) of database management system 102.

In one embodiment, audit log creator 203 stores in the created structured audit log the metadata extracted and identified by analyzing engine 201, raw data images, if any, that were recorded by recording engine 202, as well as any pointers provided by analyzing engine 201 that point to a structured audit log(s) associated with historical queries.

Examples of software tools utilized by audit log creator 203 to create a structured audit log and store the information discussed above in such a created structured audit log include, but not limited to, Erwin® Data Modeler, ER/Studio®, DbSchema, ERBuilder, HeidiSQL, Navicat® Data Modeler, Toad Data Modeler, Archi, etc.

Database management system 102 additionally includes a query engine 204 configured to receive and process queries issued from the user of computing device 101, including queries to audit database 104 via the structured audit log.

In one embodiment, query engine 204 (e.g., Presto®, Apache® Drill, Cloudera® Impala, Apache® Spark, etc.) is configured to receive a query request to audit database 104 from the user of computing device 101. In one embodiment, the query to audit database 104 includes the record or row identifier (RID) of the record or row of the table, list or index of database 104 for which to perform an audit. In one embodiment, query engine 204 searches the RIDs associated with the structured audit logs to determine if there is a match. In one embodiment, each structured audit log is associated with a RID, where such information is stored in a data structure. In one embodiment, query engine 204 searches through such a data structure to identify any matching RIDs. In one embodiment, query engine 204 utilizes natural language processing to identify any matches in the data structure. In one embodiment, such a data structure is stored in a storage device (e.g., memory, disk unit) of database management system 102.

In one embodiment, query engine 204 analyzes the query request to audit database 104 from the user of computing device 101 to determine which record(s) or row(s) of the table, list or index of database 104 to conduct the audit. For example, the query may include a record or row number function or a select clause which identifies the record(s) or row(s) of the table, list or index of database 104 to conduct the audit. Upon identifying the record or row of the table, list or index of database 104, the record or row identifier (RID) can be identified via the ROWID statement.

Once the RID is identified, query engine 204 may determine if there is a match between such an RID and an RID of a structured audit log stored in the data structure discussed above. For example, as discussed above, in one embodiment, query engine 204 utilizes natural language processing to identify any matches in the data structure.

If there is a match between the RID associated with the query and the RID of a structured audit log, then query engine 204 retrieves the audited information (e.g., metadata, raw data image) from the matching structured audit log. Such audited information is then provided to the user of computing device 101, such as via the user interface of computing device 101.

Alternatively, if there is not a match between the RID associated with the query and the RID of a structured audit log, then query engine 204 informs the requester (user of computing device 101) that the record or row of the table, list or index of database 104 has not been accessed.

A further description of these and other functions is provided below in connection with the discussion of the method for improving accuracy and efficiency of database auditing by utilizing a structured audit log.

Prior to the discussion of the method for improving accuracy and efficiency of database auditing by utilizing a structured audit log, a description of the hardware configuration of database management system 102 (FIG. 1) is provided below in connection with FIG. 3.

Figure 3:
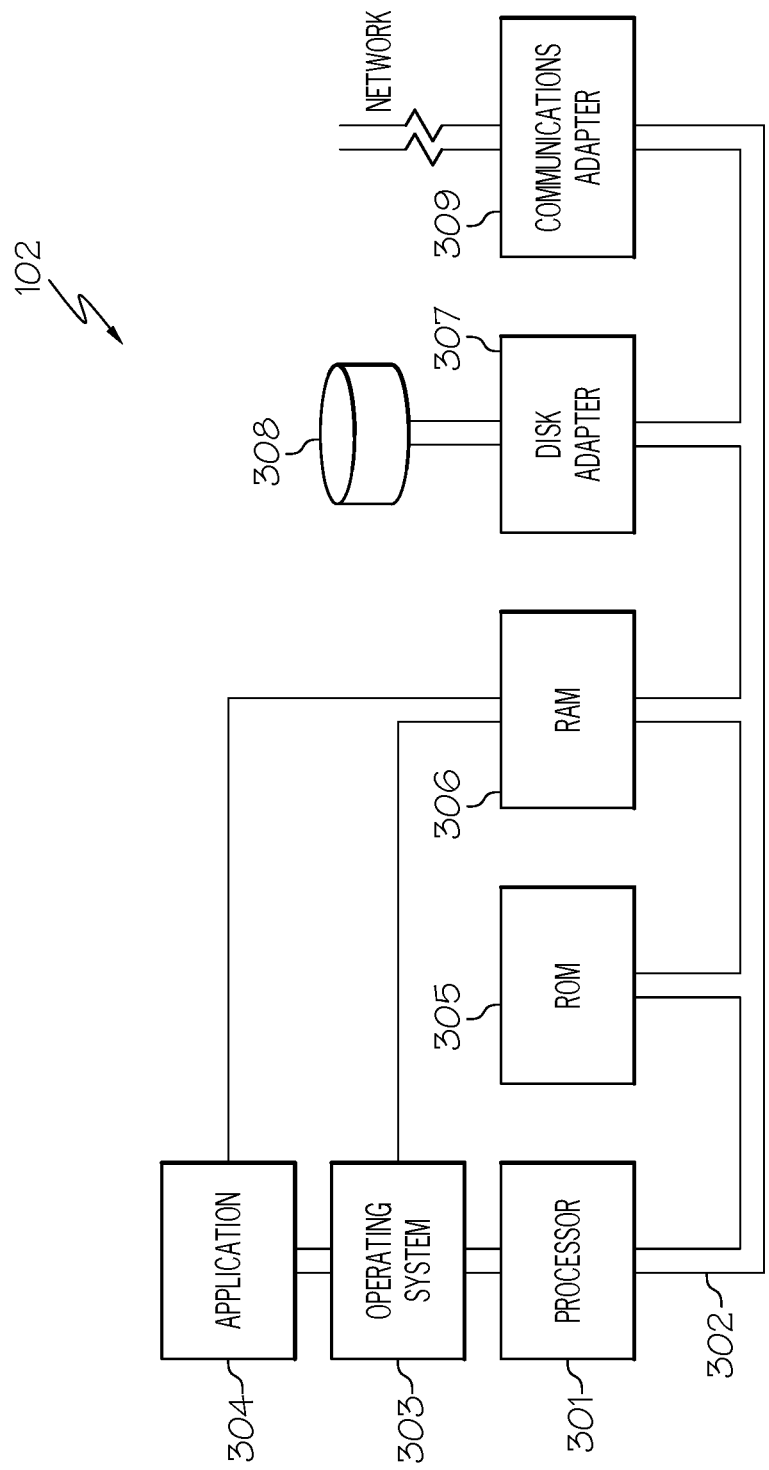
FIG. 3 illustrates an embodiment of the present disclosure of the hardware configuration of the database management system which is representative of a hardware environment for practicing the present disclosure.

Referring now to FIG. 3, FIG. 3 illustrates an embodiment of the present disclosure of the hardware configuration of database management system 102 (FIG. 1) which is representative of a hardware environment for practicing the present disclosure.

Database management system 102 has a processor 301 connected to various other components by system bus 302. An operating system 303 runs on processor 301 and provides control and coordinates the functions of the various components of FIG. 3. An application 304 in accordance with the principles of the present disclosure runs in conjunction with operating system 303 and provides calls to operating system 303 where the calls implement the various functions or services to be performed by application 304. Application 304 may include, for example, analyzing engine 201 (FIG. 2), recording engine 202 (FIG. 2), audit log creator 203 (FIG. 2) and query engine 204 (FIG. 2). Furthermore, application 304 may include, for example, a program for improving accuracy and efficiency of database auditing by utilizing a structured audit log as discussed further below in connection with FIGS. 4-10.

Referring again to FIG. 3, read-only memory ("ROM") 305 is connected to system bus 302 and includes a basic input/output system ("BIOS") that controls certain basic functions of database management system 102. Random access memory ("RAM") 306 and disk adapter 307 are also connected to system bus 302. It should be noted that software components including operating system 303 and application 304 may be loaded into RAM 306, which may be database management system's 102 main memory for execution. Disk adapter 307 may be an integrated drive electronics ("IDE") adapter that communicates with a disk unit 308, e.g., disk drive. It is noted that the program for improving accuracy and efficiency of database auditing by utilizing a structured audit log, as discussed further below in connection with FIGS. 4-10, may reside in disk unit 308 or in application 304.

Database management system 102 may further include a communications adapter 309 connected to bus 302. Communications adapter 309 interconnects bus 302 with an outside network (e.g., network 103 of FIG. 1) to communicate with other devices, such as computing device 101 (FIG. 1).

In one embodiment, application 304 of database management system 102 includes the software components of analyzing engine 201, recording engine 202, audit log creator 203 and query engine 204. In one embodiment, such components may be implemented in hardware, where such hardware components would be connected to bus 302. The functions discussed above performed by such components are not generic computer functions. As a result, database management system 102 is a particular machine that is the result of implementing specific, non-generic computer functions.

In one embodiment, the functionality of such software components (e.g., analyzing engine 201, recording engine 202, audit log creator 203 and query engine 204) of database management system 102, including the functionality for improving accuracy and efficiency of database auditing by utilizing a structured audit log, may be embodied in an application specific integrated circuit.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As stated above, database auditing is the monitoring and recording of selected user database actions. It can be based on individual actions, such as the type of SQL statement executed, or a combination of factors, such as the user name, application, time, etc. Based on the uses of database auditing, it is important to identify which rows and columns of a database were accessed as well as by whom and when. Unfortunately, such information is not easily tracked and recorded, especially for NoSQL ("non-structured query language (SQL)") databases. A NoSQL database provides a mechanism for storage and retrieval of data that is modeled in means other than the tabular relations used in relational databases. The data structures used by NoSQL databases (e.g., key-value pair) are different from those used by default in relational databases making some operations faster in NoSQL. Furthermore, NoSQL databases utilize an unstructured storage which allows for high-performance, agile processing of information at a massive scale. For example, a NoSQL database may store unstructured data across multiple processing nodes as well as across multiple servers. However, by storing unstructured data across multiple processing nodes as well as across multiple servers, it causes auditing of such databases to be a challenge. Currently, an audit plugin may be utilized to attempt to monitor and record database actions, such as for a NoSQL database. Unfortunately, only data operations (e.g., update operation, read operation) are recorded. As a result of the limited data that is monitored and recorded, the auditing is deficient in terms of identifying which rows and columns of a database were accessed as well as by whom and when. Alternatively, a temporal table, may be utilized to attempt to monitor and record database actions, such as for a NoSQL database. Unfortunately, some operations are not recorded. As in the scenario of using the audit plugin, the use of the temporal table results in limited data being monitored and recorded thereby resulting in the auditing being deficient in terms of identifying which rows and columns of a database were accessed as well as by whom and when. Furthermore, the use of a temporal table is time consuming and inefficient, especially involving frequent reading, adding, deleting and updating operations on the database. Additionally, requests to obtain certain information, such as dirty read data in transaction concurrency (running together of two transactions, such as accessing the same database rows during overlapping time periods), may not be achievable using a temporal table. Consequently, there is not currently a means for effectively auditing database actions in an efficient manner that enables accurate attestation of data accesses of the database (e.g., NoSQL database).

Figure 4:
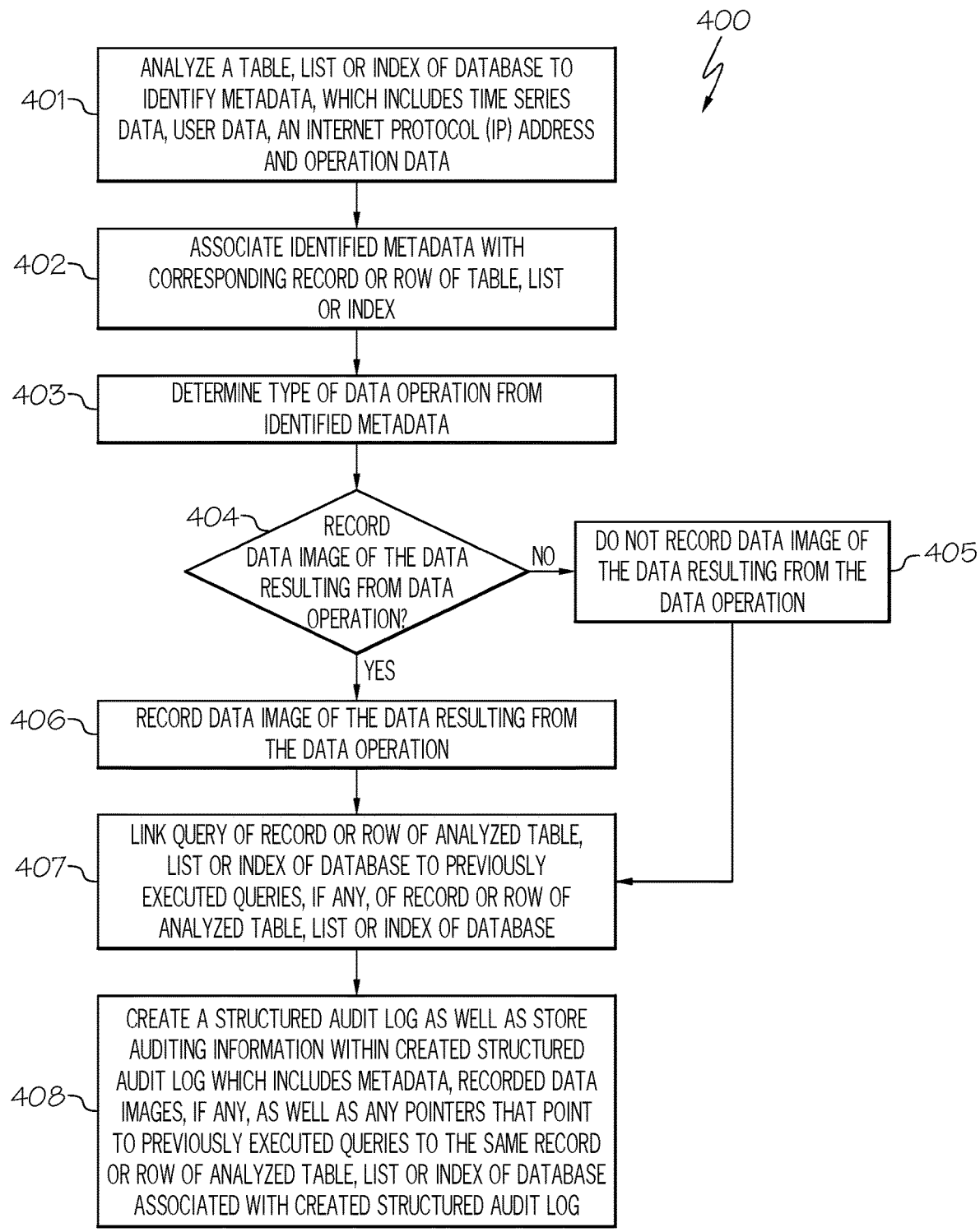
FIG. 4 is a flowchart of a method for building a structured audit log in accordance with an embodiment of the present disclosure.
Figure 5:
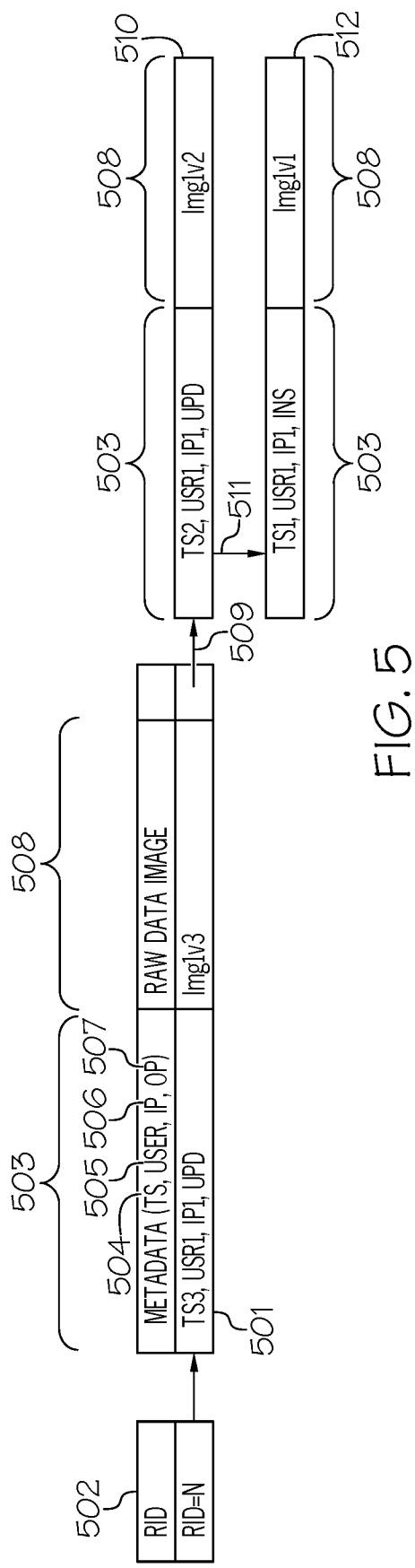
FIG. 5 illustrates a structured audit log involving the update operation in accordance with an embodiment of the present disclosure.
Figure 6:
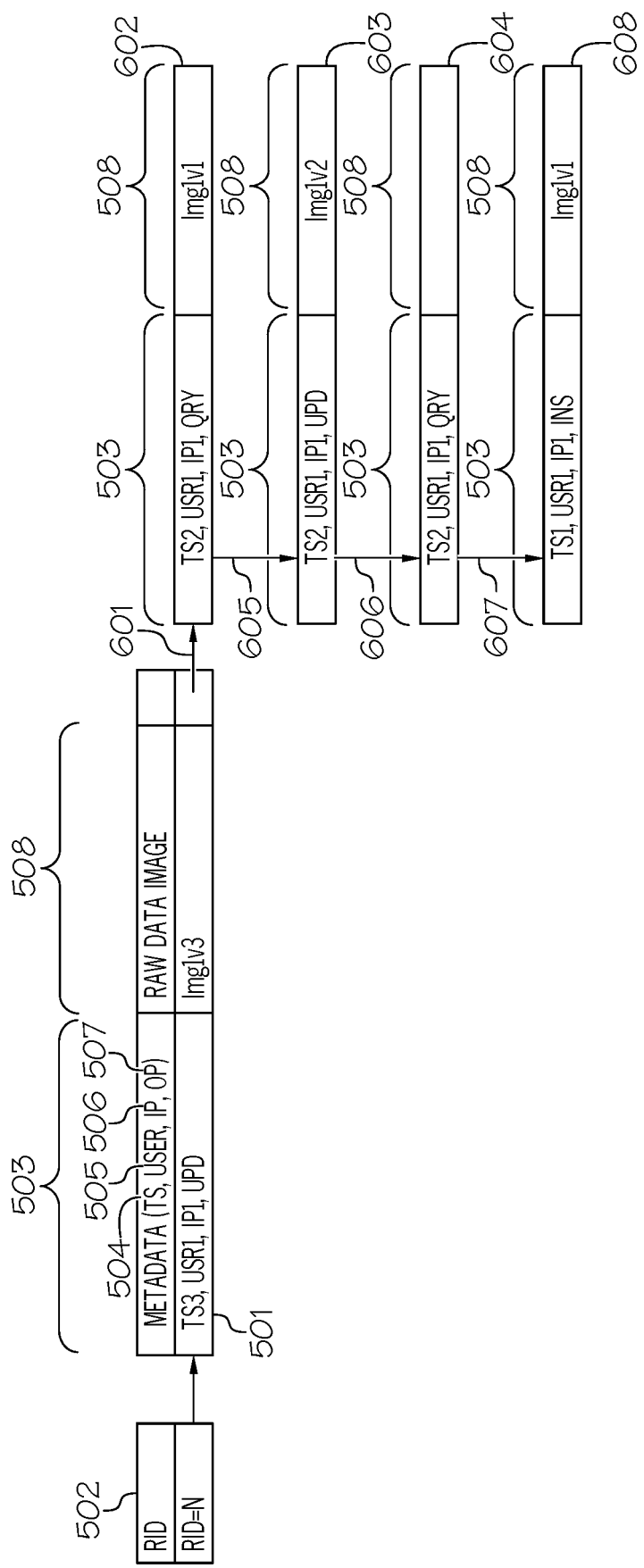
FIG. 6 illustrates a structured audit log involving the read or query operation in accordance with an embodiment of the present disclosure.
Figure 7:
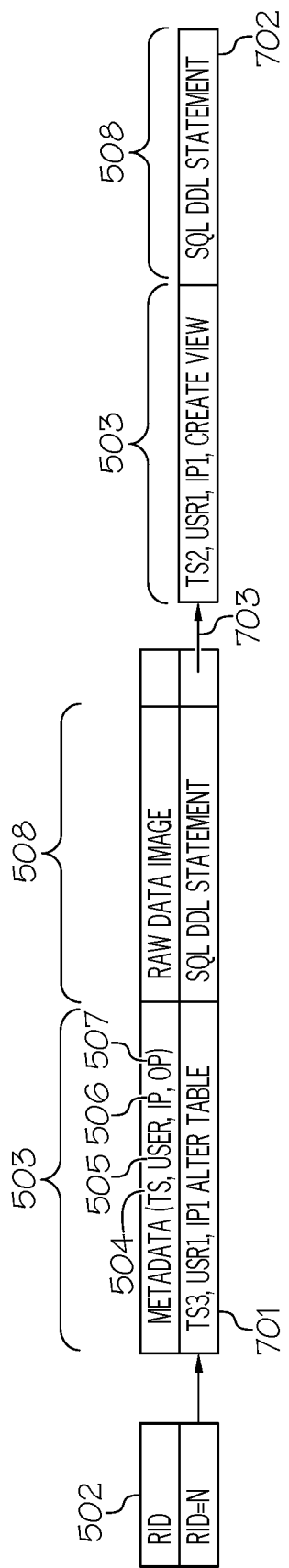
FIG. 7 illustrates a structured audit log involving a data definition language (DDL) operation in accordance with an embodiment of the present disclosure.
Figure 8:
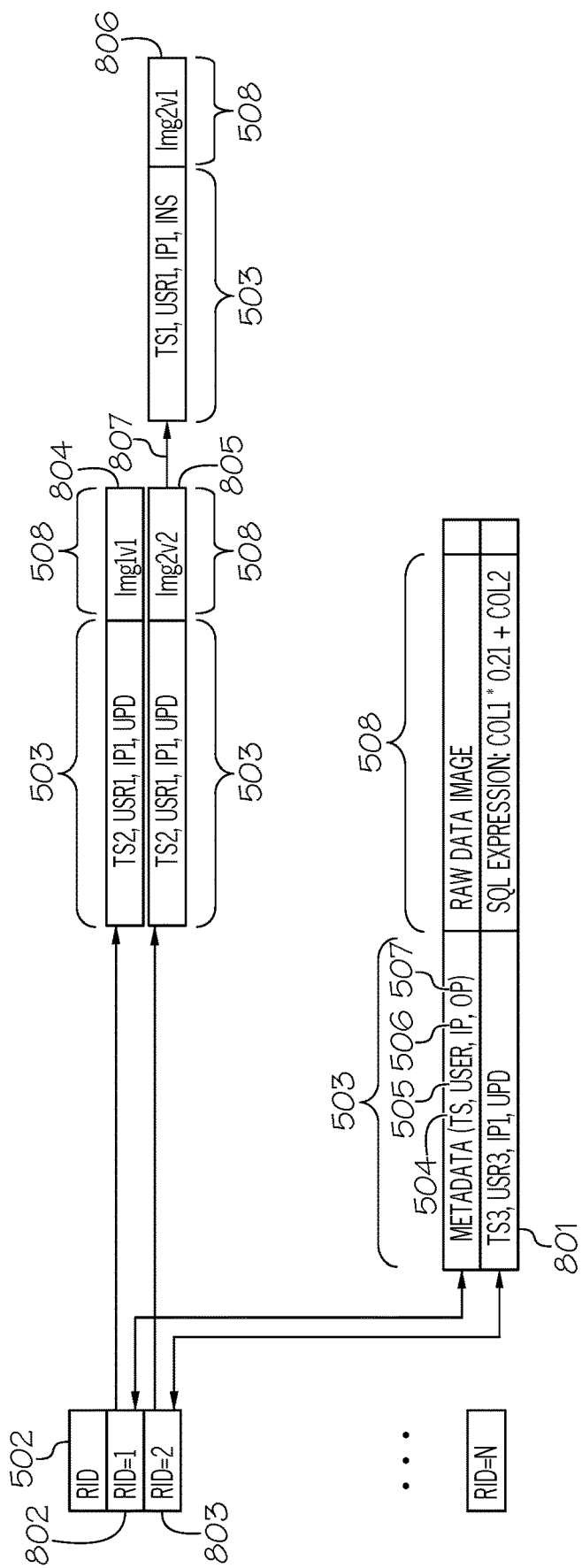
FIG. 8 illustrates a structured audit log involving the batch data manipulation language (DML) operation in accordance with an embodiment of the present disclosure.
Figure 9:
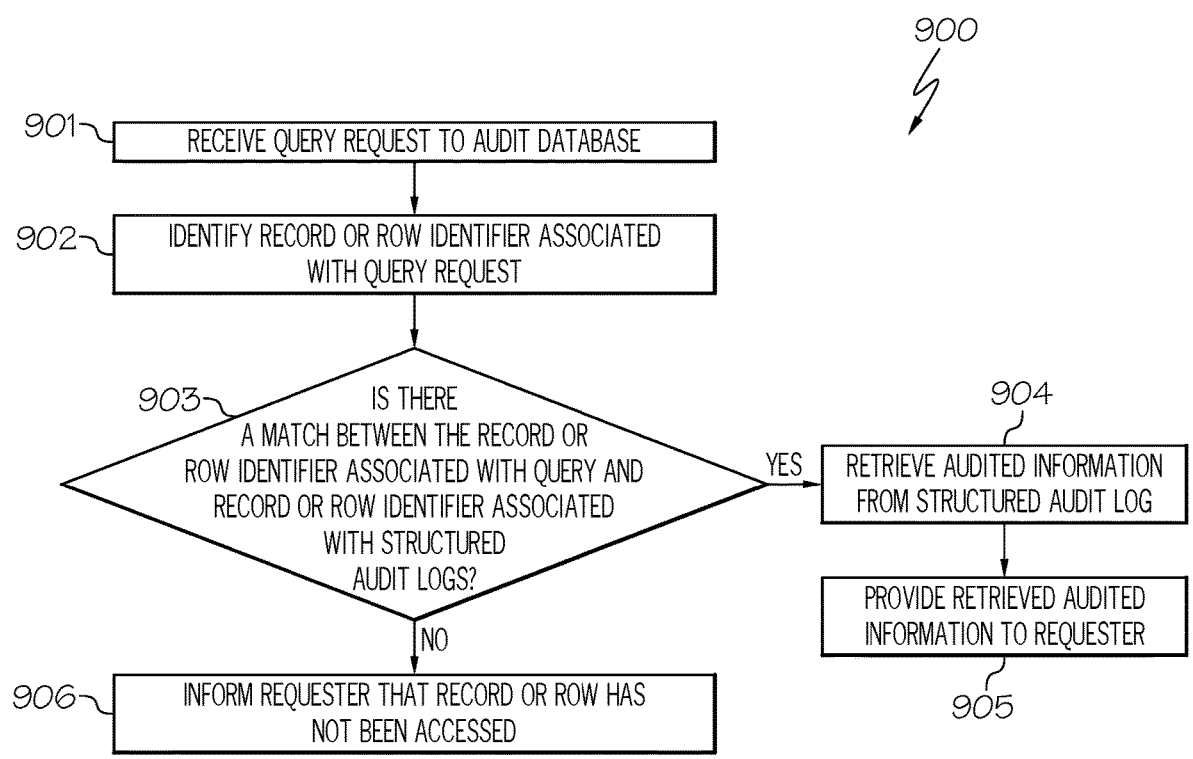
FIG. 9 is a flowchart of a method for improving accuracy and efficiency of database auditing by utilizing a structured audit log in accordance with an embodiment of the present disclosure.
Figure 10:
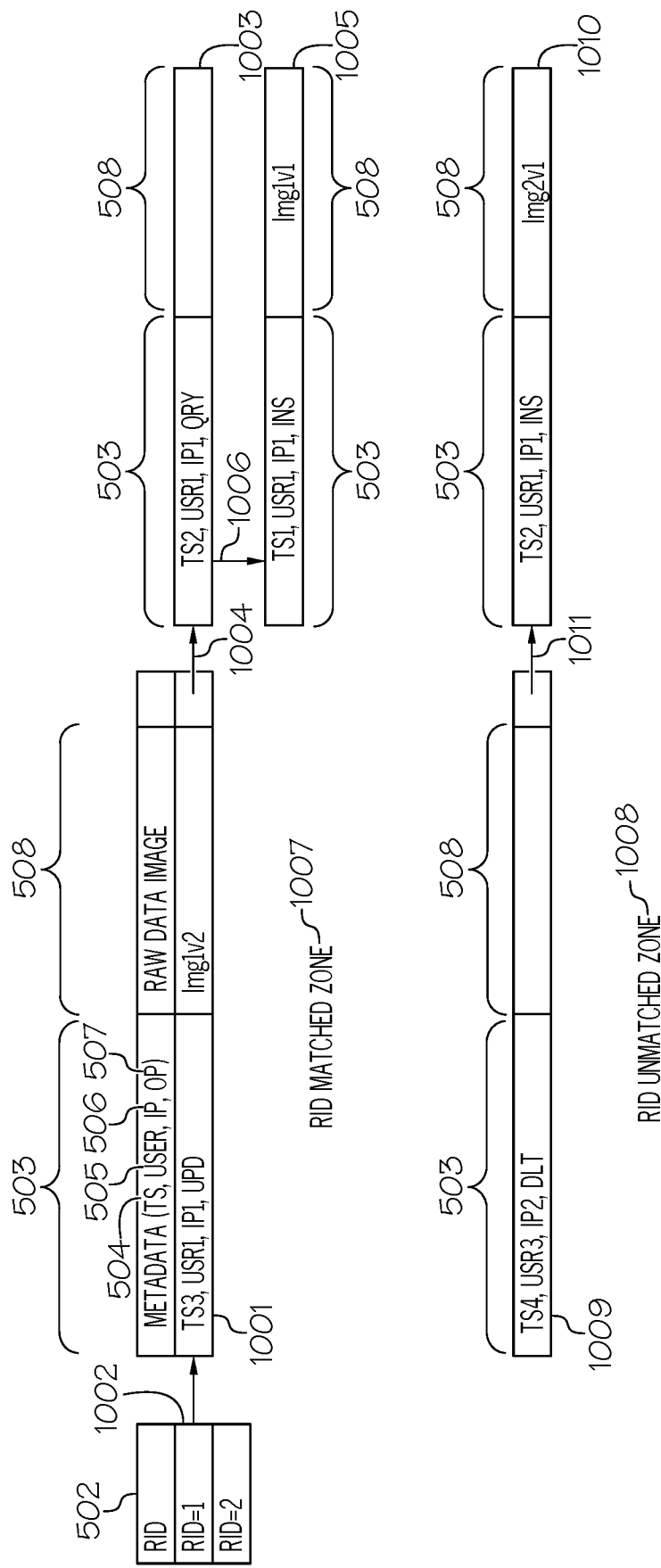
FIG. 10 illustrates matching and not matching the record or row identifiers (RIDs) associated with the structured audit logs with the RIDs associated with the queries to audit the database in accordance with an embodiment of the present disclosure.

The embodiments of the present disclosure provide a means for building and using a structured audit log for accurate attestation of data accesses of the database (e.g., NoSQL database) as discussed below in connection with FIGS. 4-10. FIG. 4 is a flowchart of a method for building a structured audit log. FIG. 5 illustrates a structured audit log involving the update operation. FIG. 6 illustrates a structured audit log involving the read or query operation. FIG. 7 illustrates a structured audit log involving a data definition language (DDL) operation. FIG. 8 illustrates a structured audit log involving the batch data manipulation language (DML) operation. FIG. 9 is a flowchart of a method for improving accuracy and efficiency of database auditing by utilizing a structured audit log. FIG. 10 illustrates matching and not matching the record or row identifiers (RIDs) associated with the structured audit logs with the RIDs associated with the queries to audit the database.

As stated above, FIG. 4 is a flowchart of a method 400 for building a structured audit log in accordance with an embodiment of the present disclosure.

Referring to FIG. 4, in conjunction with FIGS. 1-3, in operation 401, analyzing engine 201 of database management system 102 analyzes a table, list or index of database 104 to identify metadata, which includes time series data, user data, an Internet Protocol (IP) address and operation data.

As discussed above, a "table," as used herein, refers to a collection of related data held in a table format within database 104.

A "list," as used herein, refers to a set of entries or values, such as entries or values stored in a field(s) of database 104.

An "index," as used herein, refers to a data structure that improves the speed of data retrieval operations on a database table of database 104. Indexes are used to quickly locate data without having to search every row in a database table every time a database table is accessed. In one embodiment, the index is created using one or more columns of a database table, providing the basis for both rapid random lookups and efficient access of ordered records. In one embodiment, the index is a copy of selected columns of data, from a table, that is designed to enable an efficient search. In one embodiment, the index includes a "key" or direct link to the original row of data from which it was copied to allow the complete row to be retrieved efficiently.

"Metadata," as used herein, refers to data that provides information about other data. In one embodiment, metadata includes time series data, user data, an Internet Protocol (IP) address and operation data.

Furthermore, as stated above, "time series data," as used herein, refers to the particular order in which a query was issued to update, insert, delete, etc. information from a table, list or index of database 104. For example, a first query to access a row may have the time series data of TS1 (time series #1) and a subsequent query to access the same row may have the time series data of TS2 thereby indicating that the query followed the query associated with TS1.

"User data," as used herein, refers to an identifier of a particular user that issued the query to access the record or row of the table, list or index of database 104.

"Internet Protocol (IP) address," as used herein, refers to the unique identifier assigned to a device, such as database 104. In one embodiment, the IP address included in the metadata corresponds to the IP address of database 104 that is being queried by the user of computing device 101.

"Operation data," as used herein, refers to the operation that is being requested to be performed on database 104 by the query issued by the user of computing device 101. In one embodiment, such operations include the update operation, the delete operation, the read operation, a data definition language operation (used to define data structures, such as create table, alter table, drop table, create view, etc. in structured query language), a batch data manipulation language operation (used to manipulate multiple records or rows of a table, list or index of database 104), etc.

In one embodiment, analyzing engine 201 identifies the metadata from the tables, lists or indexes of database 104 via a method call, such as the getMetaData( )method using a connection object.

In one embodiment, analyzing engine 201 utilizes a database documentation tool to extract the metadata from the tables, lists or indexes of database 104. Examples of database documentation tools to extract the metadata from the tables, lists or indexes of database 104, include, but not limited to, dbdocs.io, Dataedo, Apex® SQL RedGate® SQL, SchemaSpy, dbForge Documente, DBScribe, SentryOne® DOC xPress, Innovasys Document X, etc.

In operation 402, analyzing engine 201 of database management system 102 associates the identified metadata to the corresponding record or row of the table, list or index from which the metadata was extracted.

As discussed above, in one embodiment, such an association is through the record or row identifier ("RID"), which identifies a particular record or row of the table, list or index. In one embodiment, the record or row identifier ("RID") corresponds to the address of the row in the table, list or index.

For example, if the metadata was extracted from the record or row of a table of database 104 corresponding to the record or row identifier ("RID") of 234567, then the metadata extracted from such a record or row is associated with RID 234567.

In one embodiment, analyzing engine 201 identifies the RID via the ROWID statement, such as in SQL.

In operation 403, recording engine 202 of database management system 102 determines the type of data operation (e.g., update, delete, insert, read, data definition language, data manipulation language, etc.) from the identified metadata. For example, analyzing engine 201 may have extracted metadata from a row of a table (identified with RID 12345) having the time series (TS) data of TS3, the user data of "User 1," the IP address of database 104 of "IP1" and the data operation of "UPD" representing the update operation.

In operation 404, recording engine 202 of database management system 102 determines whether to record a raw data image associated with the record or row of the analyzed table, list or index based on the corresponding data operation.

If recording engine 202 determines to not record a raw data image associated with the record or row of the analyzed table, list or index based on the corresponding data operation, then, in operation 405, recording engine 202 of database management system 102 does not record a data image associated with the record or row of the analyzed table, list or index. A further explanation of operation 405 is provided further below.

If, however, recording engine 202 determines to record a raw data image associated with the record or row of the analyzed table, list or index based on the corresponding data operation, then, in operation 406, recording engine 202 of database management system 102 records a data image of the data resulting from the operation as discussed further below in connection with FIGS. 5-8.

As discussed above, a "raw data image" or "data image," as used herein, refers to an image of the data resulting from the data operation (e.g., update operation).

In one embodiment, recording engine 202 determines whether to record a data image of the data resulting from a data operation based on the type of data operation.

In one embodiment, recording engine 202 determines the type of operation (e.g., update, delete, insert, read, data definition language, batch data manipulation language, etc.) from the extracted metadata. For example, analyzing engine 201 may have extracted metadata from a row of a table of database 104 (identified by RID 12345) having the time series (TS) data of TS3, the user data of "User 1," the IP address of database 104 of "IP1" and the data operation of "UPD" representing the update operation.

As discussed above, in one embodiment, recording engine 202 determines whether to record a raw data image associated with the record or row of the analyzed table, list or index of database 104 based on the corresponding data operation. In one embodiment, recording engine 202 records a data image of the data resulting from the update ("UPD") or insert ("INS") operation after execution of said operation. In one embodiment, recording engine 202 does not record a data image of the data resulting from a read/query operation ("QRY") except when a concurrent transaction exists. In this manner, dirty read data involving a transaction concurrency may be obtained as discussed further below. A "dirty read," as used herein, occurs when a transaction reads data that has not yet been committed. For example, suppose that transaction 1 updates a row of database 104. Transaction 2 reads the updated row before transaction 1 commits the update. Such a situation is said to correspond to a "dirty read."

In one embodiment, recording engine 202 does not record the data image of the data resulting from a delete operation ("DLT").

In one embodiment, recording engine 202 records the SQL data definition language (DDL) statement as the data image resulting from the DDL operation. In one embodiment, a "DDL" operation is used to define data structures, such as create table, alter table, drop table, create view, etc. in structured query language (SQL).

In one embodiment, recording engine 202 records the SQL expression as the data image resulting from a batch data manipulation language (DML) operation. In one embodiment, a DML operation is used to manipulate data itself. Examples of a DML operation include the insert, update or delete instruction in SQL.

Examples of software tools utilized by recording engine 202 to record data images, if applicable, include, but not limited to, Equalum®, Hevo Data, HVR, IBM® Web Sphere®, Qlik®, Oracle® GoldenGate®, Precisely®, Striim®. Talend®, etc.

Upon recording engine 202 recording or not recoding a data image of the data resulting from the data operation, in operation 407, analyzing engine 201 of database management system 102 links the query of the record or row of the analyzed table, list or index of database 104 to previously executed queries, if any, of the record or row of the analyzed table, list or index based on the time series data. For example, a query issued by the user of computing device 101 to request to access data from a particular record or row of the table, list or index of database 104, such as to manipulate or retrieve it, may occur at time T3. A prior query accessing the same record or row of the table, list or index of database 104 may occur at time T2, which may have occurred after the query accessed the same record or row of the table, list or index of database 104 at time T1. The query that occurred at time T3 may then be linked to the queries that occurred at times T2 and T1.

As discussed above, in one embodiment, such linking may be accomplished via pointers provided by analyzing engine 201, such as a pointer in the structured audit log associated with the query at time T3 that points to the structured audit log associated with the query at time T2 that contains a pointer that points to the structured audit log associated with the query at time T1. In this manner, the result sets (structured audit logs with metadata and data images, if applicable) of historical queries can be retrieved easily.

In one embodiment, analyzing engine 201 determines such linking based on the record or row identifier ("RID") associated with the queries. For example, the query that occurred at times T1, T2 and T3 may all be associated with the same RID, such as 12345. In one embodiment, analyzing engine 201 stores the RIDs for the analyzed tables, lists or indexes of database 104, such as in a data structure (e.g., table). In one embodiment, analyzing engine 201 further stores the time series data associated with the RIDs in the data structure. Such time series data can be used to link the structured audit logs (contain time series data as discussed further below) associated with the queries that occurred in the past that are associated with the same RID. In one embodiment, such a data structure is stored in the storage device (e.g., memory 305, disk unit 308) of database management system 102.

In operation 408, audit log creator 203 of database management system 102 creates a structured audit log as well as stores auditing information within the created structured audit log, such as the metadata extracted and identified by analyzing engine 201, raw data images, if any, that were recorded by recording engine 202, as well as any pointers provided by analyzing engine 201 that point to a structured audit log(s) associated with historical queries (i.e., pointers that point to previously executed queries to the same record or row of the analyzed table, list or index of database 102 associated with the created structured audit log). In one embodiment, such a structured audit log, as well as the auditing information stored in the structured audit log, are associated with a record or row identifier of a record or row of the analyzed table, list or index.

As discussed above, a "structured audit log," as used herein, refers to a data structure that stores the metadata extracted and identified by analyzing engine 201, raw data images, if any, that were recorded by recording engine 202, as well as any pointers provided by analyzing engine 201 that point to a structured audit log(s) associated with historical queries. In one embodiment, such structured audit logs are stored in a storage device (e.g., memory 305, disk unit 308) of database management system 102.

Examples of software tools utilized by audit log creator 203 to create a structured audit log and store the auditing information discussed above in such a created structured audit log include, but not limited to, Erwin® Data Modeler, ER/Studio®, DbSchema, ERBuilder, HeidiSQL, Navicat® Data Modeler, Toad Data Modeler, Archi, etc.

An illustration of storing metadata and recorded data images, if any, in a structured audit log along with pointers to any previously executed queries is discussed below in connection with FIGS. 5-8.

As discussed above, in one embodiment, recording engine 202 records a data image of the data resulting from the update ("UPD") or insert ("INS") operation after execution of said operation, such as illustrated in FIG. 5.

FIG. 5 illustrates a structured audit log 501 involving the update operation in accordance with an embodiment of the present disclosure.

As will be discussed in further detail below, the extracted metadata, including any recorded data images, will be stored in a structured audit log, such as structured audit log 500 of FIG. 5.

As shown in FIG. 5, structured audit log 501 is associated with a record or row identifier (RID) 502. In one embodiment, structured audit log 501 includes the metadata field 503 identified by analyzing engine 201 for the record or row of the analyzed table, list or index of database 104 that is identified by RID 502. For example, metadata 503 includes the time series (TS) data 504, the user data 505, the IP address 506, such as the IP address 506 of database 104, as well as the data operation ("OP") 507. As shown in FIG. 5, TS data 504 corresponds to the time of TS3. The user data 505 corresponds to user #1 ("USR1"). The IP address 506 of database 104 corresponds to "IP1" (e.g., 192.158.1.38). The data operation 507 corresponds to the update operation ("UPD").

Furthermore, in one embodiment, structured audit log 501 includes a raw data image field 508, which may be utilized to store a recorded data image.

In one embodiment, in order to save storage space, recording engine 202 records a data image 508 of the data resulting from the update ("UPD") operation after execution of said operation as shown in FIG. 5. For example, such a data image 508 is recorded and saved in structured audit log 501 as "Img1v3."

Furthermore, as shown in FIG. 5, structured audit log 501 includes a pointer 509 to structured audit log 510, which is structured similarly as structured audit log 501. As discussed above, time series data can be used to link the structured audit logs involving the same RID. For example, structured audit log 501 is linked to structured audit log 510 since both are associated with the same RID and structured audit log 510 is associated with time T2 (see time series data field 504 of structured audit log 510) that occurs just prior to time T3 (see time series data field 504 of structured audit log 501). Similarly, as shown in FIG. 5, structured audit log 510 includes a pointer 511 to structured audit log 512 (structured similarly as structured audit log 501), which involves the same RID as structured audit log 501 but is associated with time T1 (see time series data field 504 of structured audit log 512) that occurs just prior to time T2 (see time series data field 504 of structured audit log 510).

Furthermore, as shown in FIG. 5, recording engine 202 records a data image of the data resulting from the insert ("INS") operation (see data operation field 507 of structured audit log 512) after execution of said operation. For example, such a data image is recorded and saved in structured audit log 512 in the raw data image field 508 as "Img1v1."

As discussed above, in order to save storage space, recording engine 202 records a data image of the data resulting from the update ("UPD") operation after execution of said operation. In order to obtain an image of the data prior to the update operation, a link to prior images may be utilized via pointers as discussed above.

In one embodiment, such recorded data images may only include the data of the changed rows or columns of the table, list or index of database 104.

In one embodiment, recording engine 202 does not record a data image of the data resulting from a read/query operation ("QRY") except when a concurrent transaction exists as illustrated in FIG. 6. In this manner, dirty read data in transaction concurrency may be obtained as discussed further below. A "dirty read," as used herein, occurs when a transaction reads data that has not yet been committed. For example, suppose that transaction 1 updates a row of database 104. Transaction 2 reads the updated row before transaction 1 commits the update. Such a situation is said to correspond to a "dirty read."

Referring to FIG. 6, FIG. 6 illustrates a structured audit log involving the read or query operation in accordance with an embodiment of the present disclosure.

As previously discussed in connection with FIG. 5, structured audit log 501 is associated with a record or row identifier (RID) 502. Such a structured audit log 501 may be associated with a pointer 601 that points to structured audit log 602 (structured similarly as structured audit log 501 of FIG. 5) as shown in FIG. 6. Structured audit log 501 is linked to structured audit log 602 since both are associated with the same RID and structured audit log 602 is associated with time T2 (see time series data field 504 of structured audit log 602 that occurs just prior to time T3 (see time series data field 504 of structured audit log 501).

In one embodiment, recording engine 202 typically does not record a raw data image for read/query operations ("QRY"). However, when a concurrent transaction occurs, such as shown in FIG. 6, recording engine 202 records the resulting image for the read/query operation, which is stored in the structured audit log by audit log creator 203.

For example, as shown in FIG. 6, structured audit logs 602, 603 and 604 (all structured similarly as structured audit log 501) are all associated with the time series data of TS2 in the time series data field 504. As shown in structured audit log 603, an update operation of database 104 occurs, which results in the recording of a data image (see "Img1v2" of raw data image field 508) of the data resulting from the update ("UPD") operation after execution of said operation as discussed above in connection with FIG. 5. However, as shown in structured audit log 604, a read operation ("QRY"), as shown in the data operation 507 field, may be performed prior to the update operation being committed. As a result, structured audit log 602 stores the recorded data image for the read operation (see "Img1v1" of raw data image field 508). In this manner, the dirty read data involving a transaction concurrency may be obtained.

Furthermore, as illustrated in FIG. 6, structured audit log 602 has a pointer 605 to structured audit log 603, which has a pointer 606 to structured audit log 604. Each of these structured audit logs 602, 603, 604 occur at time T2. In particular, structured audit logs 603, 604 are a concurrent transaction since both occur at the same time. As discussed above, when a transaction concurrency occurs, such as a read/query operation that is performed before an update operation is committed, a structured audit log, such as structured audit log 602, is created to store the raw data image for the read operation as explained above.

Furthermore, as shown in FIG. 6, structured audit log 604 includes a pointer 607 to link structured audit log 608 (structured similarly as structured audit log 501 of FIG. 5). As discussed above, time series data can be used to link the structured audit logs involving the same RID. For example, structured audit log 608 is linked to structured audit log 604 since both are associated with the same RID and structured audit log 608 is associated with time T1 (see time series data field 504 of structured audit log 608) that occurs just prior to time T2 (see time series data field 504 of structured audit log 604).

Furthermore, in one embodiment, recording engine 202 does not record the data image of the data resulting from a delete operation ("DLT").

In one embodiment, recording engine 202 records the SQL data definition language (DDL) statement as the data image resulting from the DDL operation as shown in FIG. 7. In one embodiment, a "DDL" operation is used to define data structures, such as create table, drop table, alter table, drop table, create view, etc. in structured query language (SQL).

FIG. 7 illustrates a structured audit log 701 involving a data definition language (DDL) operation in accordance with an embodiment of the present disclosure.

Referring to FIG. 7, structured audit log 701 (structured similarly as structured audit log 501 of FIG. 5) is created by audit log creator 203 to store the metadata obtained by analyzing engine 201 as well as the data image recorded by recording engine 202. As shown in FIG. 7, the data operation of the data operation field 507 corresponds to "alter table," which is a DDL operation. In such a situation, recording engine 202 records the SQL DDL statement as shown in the raw data image field 508.

Furthermore, as shown in FIG. 7, structured audit log 701 is linked to structured audit log 702 via pointer 703. As discussed above, time series data can be used to link the structured audit logs involving the same RID. For example, structured audit log 701 is linked to structured audit log 702 since both are associated with the same RID and structured audit log 702 is associated with time T2 (see time series data field 504 of structured audit log 702) that occurs just prior to time T3 (see time series data field 504 of structured audit log 701).

As also shown in FIG. 7, structured audit log 702 also includes a DDL operation ("create view") in the data operation field 507, which results in recording engine 202 recording the SSL DDL statement as shown in the raw data image field 508 of structured audit log 702.

In one embodiment, recording engine 202 records the SQL expression as the data image resulting from a batch data manipulation langue (DML) operation as shown in FIG. 8. In one embodiment, a DML operation is used to manipulate data itself. Examples of a DML operation include the insert, update or delete instruction in SQL.

FIG. 8 illustrates a structured audit log involving the batch data manipulation language (DML) operation in accordance with an embodiment of the present disclosure.

Referring to FIG. 8, in one embodiment, batch operations, such as batch DML operations, are tracked with the expression once. For example, a batch DML operation may involve updating multiple records.

As shown in FIG. 8, structured audit log 801 (structured similarly as structured audit log 501 of FIG. 5) is associated with two RIDs 502, namely RID=1 802 as well as RID=2 803, which represent the multiple records or rows of the table, list or index of database 104 that are updated involving the batch DML operation (multiple update operations). In one embodiment, audit log creator 203 stores in structured audit log 801 the SQL DDL statement ("Col1*0.21+Col2") associated with the batch DML operation in the raw data image field 508 of structured audit log 801.

Furthermore, as shown in FIG. 8, in such a batch DML operation, the multiple update operations are represented in structured audit logs 804, 805 (structured similarly as structured audit log 501 of FIG. 5), where structured audit log 805 is linked to structured audit log 806 (structured similarly as structured audit log 501 of FIG. 5) via pointer 807 as shown in FIG. 8. As discussed above, time series data can be used to link the structured audit logs involving the same RID. For example, structured audit log 805 is linked to structured audit log 806 since both are associated with the same RID and structured audit log 806 is associated with time T1 (see time series data field 504 of structured audit log 806) that occurs just prior to time T2 (see time series data field 504 of structured audit log 805).

Upon creating the structured audit logs, the structured audit logs may be utilized for auditing database 104 as discussed below in connection with FIG. 9.

FIG. 9 is a flowchart of a method 900 for improving accuracy and efficiency of database auditing by utilizing a structured audit log in accordance with an embodiment of the present disclosure.

Referring to FIG. 9, in conjunction with FIGS. 1-8, in operation 901, query engine 204 (e.g., Presto®, Apache® Drill, Cloudera® Impala, Apache® Spark, etc.) of database management system 102 receives a query request to audit database 104 from the user of computing device 101.

In operation 902, query engine 204 of database management system 102 identifies the record or row identifier (RID) associated with the query request.

As stated above, in one embodiment, the query to audit database 104 includes the record or row identifier (RID) of the record or row of the table, list or index of database 104 for which to perform an audit. In one embodiment, query engine 204 searches the RIDs associated with the structured audit logs to determine if there is a match. In one embodiment, each structured audit log is associated with a RID, where such information is stored in a data structure. In one embodiment, query engine 204 searches through such a data structure to identify any matching RIDs. In one embodiment, query engine 204 utilizes natural language processing to identify any matches in the data structure. In one embodiment, such a data structure is stored in a storage device (e.g., memory 305, disk unit 308) of database management system 102.

In one embodiment, query engine 204 analyzes the query request to audit database 104 from the user of computing device 101 to determine which record(s) or row(s) of the table, list or index of database 104 to conduct the audit. For example, the query may include a record or row number function or a select clause which identifies the record(s) or row(s) of the table, list or index of database 104 to conduct the audit. Upon identifying the record or row of the table, list or index of database 104, the record or row identifier (RID) can be identified via the ROWID statement.

In operation 903, a determination is made by query engine 204 of database management system 102 as to whether there is a match between the record or row identifier (RID) associated with the query and the record or row identifier associated with the structured audit logs, such as structured audit log 501.

As discussed above, the RID of the structured audit logs may be stored in a data structure, such as stored in the storage device (e.g., memory 305, disk unit 308) of database management system 102. In one embodiment, query engine 204 utilizes natural language processing to identify any matches in such a data structure.

If there is a match between the RID associated with the query and the RID associated with a structured audit log, then, in operation 904, query engine 204 of database management system 102 retrieves the audited information from the matching structured audit log as illustrated in FIG. 10. Such audited information may include the information from the metadata field 503 as well as any data images from the raw data image field 508. Furthermore, such audited information may include any audited information from any linked structured audit logs as discussed further below in connection with FIG. 10.

In operation 905, query engine 204 of database management system 102 provides such audited information to the user of computing device 101, such as via the user interface of computing device 101 as discussed below in connection with FIG. 10.

FIG. 10 illustrates matching and not matching the record or row identifiers (RIDs) associated with the structured audit logs with the RIDs associated with the queries to audit the database in accordance with an embodiment of the present disclosure.

Referring to FIG. 10, query engine 204 may perform a search for the RID associated with the query in a data structure that stores the RIDs of the structured audit logs, such as structured query log 1001. If the query is associated with RID=1, and structured query log 1001 is associated with RID=1 (see element 1002 of FIG. 10), as indicated in the data structure and shown in FIG. 10, then query engine 204 will identify the RID of structured query log 1001 as matching the RID associated with the query. Upon matching the RID associated with the query with the RID associated with the structured audit log, query engine 204 obtains the audited information, such as the information in the metadata field 503 as well as the data image, if any, in the raw data image field 508. Furthermore, such audited information may include any linked historical queries, such as the audited information in structured audit log 1003, which is linked to structured audit log 1001 via pointer 1004. Furthermore, such audited information may include the audited information in structured audit log 1005 which is linked to structured audit log 1003 via pointer 1006 as shown in FIG. 10. Such matched structured audit logs are said to be within the "RID matched zone" 1007; whereas, those structured audit logs associated with an RID that does not match the RID associated with the query to audit database 104 are said to be within the "RID unmatched zone" 1008.

For example, structured audit log 1009 may not be associated with an RID that matches the RIDs of any of the queries received by query engine 204 to audit database 104. As shown in FIG. 10, structured audit log 1009 is linked to structured audit log 1010 via pointer 1011.

Returning to operation 903 of FIG. 9, if there is a not match between the RID associated with the query to audit database 104 with an RID of a structured audit log, then, in operation 906, query engine 204 of database management system 102 informs the requester (user of computing device 101) that the record or row of the table, list or index of database 104 has not been accessed, such as via the user interface of computing device 101.

As a result of the foregoing, embodiments of the present disclosure provide a means for building and using a structured audit log for accurate attestation of data accesses of the database (e.g., NoSQL database).

Furthermore, the principles of the present disclosure improve the technology or technical field involving database auditing. As discussed above, database auditing is the monitoring and recording of selected user database actions. It can be based on individual actions, such as the type of SQL statement executed, or a combination of factors, such as the user name, application, time, etc. Based on the uses of database auditing, it is important to identify which rows and columns of a database were accessed as well as by whom and when. Unfortunately, such information is not easily tracked and recorded, especially for NoSQL ("non-structured query language (SQL)") databases. A NoSQL database provides a mechanism for storage and retrieval of data that is modeled in means other than the tabular relations used in relational databases. The data structures used by NoSQL databases (e.g., key-value pair) are different from those used by default in relational databases making some operations faster in NoSQL. Furthermore, NoSQL databases utilize an unstructured storage which allows for high-performance, agile processing of information at a massive scale. For example, a NoSQL database may store unstructured data across multiple processing nodes as well as across multiple servers. However, by storing unstructured data across multiple processing nodes as well as across multiple servers, it causes auditing of such databases to be a challenge. Currently, an audit plugin may be utilized to attempt to monitor and record database actions, such as for a NoSQL database. Unfortunately, only data operations (e.g., update operation, read operation) are recorded. As a result of the limited data that is monitored and recorded, the auditing is deficient in terms of identifying which rows and columns of a database were accessed as well as by whom and when. Alternatively, a temporal table, may be utilized to attempt to monitor and record database actions, such as for a NoSQL database. Unfortunately, some operations are not recorded. As in the scenario of using the audit plugin, the use of the temporal table results in limited data being monitored and recorded thereby resulting in the auditing being deficient in terms of identifying which rows and columns of a database were accessed as well as by whom and when. Furthermore, the use of a temporal table is time consuming and inefficient, especially involving frequent reading, adding, deleting and updating operations on the database. Additionally, requests to obtain certain information, such as dirty read data in transaction concurrency (running together of two transactions, such as accessing the same database rows during overlapping time periods), may not be achievable using a temporal table. Consequently, there is not currently a means for effectively auditing database actions in an efficient manner that enables accurate attestation of data accesses of the database (e NoSQL database).

Embodiments of the present disclosure improve such technology by analyzing a table, list or index of a database to identify metadata, which includes time series data, user data, an Internet Protocol address and operation data. "Metadata," as used herein, refers to data that provides information about other data. "Time series data," as used herein, refers to the particular order in which a query was issued to update, insert, delete, etc. information from a table, list or index of the database. "User data," as used herein, refers to an identifier of a particular user that issued the query to access the record or row of the table, list or index of the database. "Internet Protocol (IP) address," as used herein, refers to the unique identifier assigned to a device, such as the database. "Operation data," as used herein, refers to the operation that is being requested to be performed on the database by the query issued by the user of a computing device. In one embodiment, such operations include the update operation, the delete operation, the read operation, a data definition language operation (used to define data structures, such as create table, alter table, drop table, create view, etc. in a structured query language), a batch data manipulation language operation (used to manipulate multiple records or rows of a table, list or index of the database), etc. The identified metadata is associated with the corresponding record or row of the table, list or index of the database from which the metadata was extracted. A determination is then made as to whether to record a raw data image associated with the record or row of the analyzed table, list or index of the database based on the corresponding data operation. A "raw data image" or "data image," as used herein, refers to an image of the data resulting from the data operation (e.g., update operation). For example, a data image of the data resulting from the data operation may be recorded in response to an update or insert operation. However, the data image of the data resulting from the data operation may not be recorded in response to a delete operation or in response to a read/query operation except when a concurrent transaction exists. The identified metadata as well as the recorded data images, if any, are then stored in a "structured audit log" associated with the record or row identifier of the record or row of the analyzed table, list or index of the database upon which such structured information was obtained. A "structured audit log," as used herein, refers to a data structure that stores said auditing information (e.g., metadata, recorded data images, etc.). In one embodiment, the structured audit log is stored in the storage device (e.g., memory, disk unit) of a database management system in which future queries to audit the database may access such stored structured audit logs to obtain auditing information about the database. In one embodiment, the appropriate auditing information is obtained from the stored structured audit logs based on matching the row or record identifier associated with the query with the record or row identifier associated with a structured audit log containing the requested database auditing information. In this manner, the accuracy and efficiency of database auditing is improved by utilizing structured audit logs. Furthermore, in this manner, there is an improvement in the technical field involving database auditing.

The technical solution provided by the present disclosure cannot be performed in the human mind or by a human using a pen and paper. That is, the technical solution provided by the present disclosure could not be accomplished in the human mind or by a human using a pen and paper in any reasonable amount of time and with any reasonable expectation of accuracy without the use of a computer.

In one embodiment of the present disclosure, a computer-implemented method for improving accuracy and efficiency of database auditing comprises analyzing a table, list or index of a database to identify metadata, where the metadata comprises time series data, user data, an Internet Protocol (IP) address and operation data. The method further comprises associating the identified metadata with a corresponding record or row of the analyzed table, list or index of the database. The method additionally comprises determining whether to record a data image associated with the record or row of the analyzed table, list or index of the database based on a corresponding data operation. Furthermore, the method comprises storing the identified metadata and a recorded data image, if any, in a structured audit log associated with a record or row identifier of the record or row of the analyzed table, list or index of the database.

Additionally, in one embodiment of the present disclosure, the method further comprises recording an image of data resulting from a read operation when a concurrent transaction exists. Additionally, the method comprises obtaining dirty read data involving a transaction concurrency from the structured audit log in response to storing the recorded image of the data resulting from the read operation in the structured audit log when the concurrent transaction exists.

Furthermore, in one embodiment of the present disclosure, the method further comprises recording a structured query language data definition language statement as a data image for a data definition language operation. The method additionally comprises recording a structured query language expression as a data image for a batch data manipulation language operation.

Additionally, in one embodiment of the present disclosure, the method further comprises linking a query of the record or row of the analyzed table, list or index of the database to previously executed queries of the record or row of the analyzed table, list or index of the database.

Furthermore, in one embodiment of the present disclosure, the method further comprises storing a pointer in the structured audit log to link the query of the record or row of the analyzed table, list or index of the database to a previously executed query of the record or row of the analyzed table, list or index of the database.

Additionally, in one embodiment of the present disclosure, the method further comprises receiving a query request to audit the database. The method additionally comprises identifying a record or row identifier of a table, list or index of the database in connection with the query request to audit the database.

Furthermore, in one embodiment of the present disclosure, the method further comprises retrieving audited information from the structured audit log in response to a match between the identified record or row identifier associated with the query request and the record or row identifier associated with the structured audit log.

Other forms of the embodiments of the method described above are in a system and in a computer program product.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer-implemented method for improving accuracy and efficiency of database auditing, the method comprising:
analyzing a table, list or index of a database to identify metadata;
storing said identified metadata and a recorded data image, if any, in a structured audit log associated with a record or row identifier of a record or row of said analyzed table, list or index of said database;
storing a pointer in said structured audit log to link a query of said record or row of said analyzed table, list or index of said database to a previously executed query of said record or row of said analyzed table, list or index of said database; and
retrieving auditing information from said structured audit log in response to matching a row or record identifier associated with a query to audit said database with said record or row identifier associated with said structured audit log.

2. The method as recited in claim 1 further comprising:
recording an image of data resulting from a read operation in response to a concurrent transaction existing; and
obtaining dirty read data involving a transaction concurrency from said structured audit log in response to storing said recorded image of said data resulting from said read operation in said structured audit log in response to said concurrent transaction existing.

3. The method as recited in claim 1 further comprising:
recording a data image of data resulting from a data definition language operation; and
recording a data image of data resulting from a batch data manipulation language operation.

4. The method as recited in claim 1 further comprising:
linking said query of said record or row of said analyzed table, list or index of said database to previously executed queries of said record or row of said analyzed table, list or index of said database based on time series data.

5. The method as recited in claim 1 further comprising:
receiving said query to audit said database; and
identifying said record or row identifier of a table, list or index of said database in connection with said query to audit said database.

6. The method as recited in claim 1 further comprising:
associating said identified metadata with a corresponding record or row of said analyzed table, list or index of said database; and
determining whether to record a data image associated with said record or row of said analyzed table, list or index of said database based on a corresponding data operation.

7. A computer program product for improving accuracy and efficiency of database auditing, the computer program product comprising one or more computer readable storage mediums having program code embodied therewith, the program code comprising programming instructions for:
analyzing a table, list or index of a database to identify metadata;

storing said identified metadata and a recorded data image, if any, in a structured audit log associated with a record or row identifier of a record or row of said analyzed table, list or index of said database;

storing a pointer in said structured audit log to link a query of said record or row of said analyzed table, list or index of said database to a previously executed query of said record or row of said analyzed table, list or index of said database; and retrieving auditing information from said structured audit log in response to matching a row or record identifier associated with a query to audit said database with said record or row identifier associated with said structured audit log.

8. The computer program product as recited in claim 7, wherein the program code further comprises the programming instructions for:

recording an image of data resulting from a read operation in response to a concurrent transaction existing; and obtaining dirty read data involving a transaction concurrency from said structured audit log in response to storing said recorded image of said data resulting from said read operation in said structured audit log in response to said concurrent transaction existing.

9. The computer program product as recited in claim 7, wherein the program code further comprises the programming instructions for:

recording a data image of data resulting from a data definition language operation; and recording a data image of data resulting from a batch data manipulation language operation.

10. The computer program product as recited in claim 7, wherein the program code further comprises the programming instructions for:

linking said query of said record or row of said analyzed table, list or index of said database to previously executed queries of said record or row of said analyzed table, list or index of said database based on time series data.

11. The computer program product as recited in claim 7, wherein the program code further comprises the programming instructions for:

receiving said query to audit said database; and identifying said record or row identifier of a table, list or index of said database in connection with said query to audit said database.

12. The computer program product as recited in claim 7, wherein the program code further comprises the programming instructions for:

associating said identified metadata with a corresponding record or row of said analyzed table, list or index of said database; and determining whether to record a data image associated with said record or row of said analyzed table, list or index of said database based on a corresponding data operation.

13. A system, comprising:

a memory for storing a computer program for improving accuracy and efficiency of database auditing; and a processor connected to said memory, wherein said processor is configured to execute program instructions of the computer program comprising:

analyzing a table, list or index of a database to identify metadata;

storing said identified metadata and a recorded data image, if any, in a structured audit log associated with a record or row identifier of a record or row of said analyzed table, list or index of said database;

storing a pointer in said structured audit log to link a query of said record or row of said analyzed table, list or index of said database to a previously executed query of said record or row of said analyzed table, list or index of said database; and retrieving auditing information from said structured audit log in response to matching a row or record identifier associated with a query to audit said database with said record or row identifier associated with said structured audit log.

14. The system as recited in claim 13, wherein the program instructions of the computer program further comprise:

recording an image of data resulting from a read operation in response to a concurrent transaction existing; and obtaining dirty read data involving a transaction concurrency from said structured audit log in response to storing said recorded image of said data resulting from said read operation in said structured audit log in response to said concurrent transaction existing.

15. The system as recited in claim 13, wherein the program instructions of the computer program further comprise:

recording a data image of data resulting from a data definition language operation; and recording a data image of data resulting from a batch data manipulation language operation.

16. The system as recited in claim 13, wherein the program instructions of the computer program further comprise:

linking said query of said record or row of said analyzed table, list or index of said database to previously executed queries of said record or row of said analyzed table, list or index of said database based on time series data.

17. The system as recited in claim 13, wherein the program instructions of the computer program further comprise:

receiving said query to audit said database; and identifying said record or row identifier of a table, list or index of said database in connection with said query to audit said database.

* * * * *